United States Patent
Lohberg et al.

(10) Patent No.: US 8,698,488 B2
(45) Date of Patent: Apr. 15, 2014

(54) ARRANGEMENT FOR INTRINSICALLY SAFE DETECTION OF A WHEEL ROTATIONAL SPEED

(75) Inventors: Peter Lohberg, Friedrichsdorf (DE); Wolfgang Fritz, Linden (DE); Klaus Rink, Rodenbach (DE)

(73) Assignee: Continental Teves AG & Co. OHG, Frankfurt (DE)

( * ) Notice: Subject to any disclaimer, the term of this patent is extended or adjusted under 35 U.S.C. 154(b) by 1243 days.

(21) Appl. No.: 11/920,480

(22) PCT Filed: May 17, 2006

(86) PCT No.: PCT/EP2006/062375
§ 371 (c)(1),
(2), (4) Date: Oct. 10, 2011

(87) PCT Pub. No.: WO2006/122945
PCT Pub. Date: Nov. 23, 2006

(65) Prior Publication Data
US 2012/0092000 A1    Apr. 19, 2012

(30) Foreign Application Priority Data
May 17, 2005    (DE) .......................... 10 2005 022 596

(51) Int. Cl.
*G01P 3/00*    (2006.01)
(52) U.S. Cl.
USPC ..................................... 324/174; 324/207.25
(58) Field of Classification Search
USPC ............................................ 324/207.25, 174
See application file for complete search history.

(56) References Cited

U.S. PATENT DOCUMENTS

2003/0000307 A1    1/2003  Lohberg

FOREIGN PATENT DOCUMENTS

| CH | 448753 | 4/1968 |
| DE | 19520299 | 12/1996 |
| DE | 19538163 | 3/1997 |
| DE | 10233080 | 2/2004 |
| WO | 03087845 | 10/2003 |

*Primary Examiner* — Reena Aurora

(57) ABSTRACT

Disclosed is an arrangement for detecting rotational speed of a wheel or any other rotating body by a sensor (1, 6), which is coupled via a magnetic field to an encoder (23) that rotates with the rotating body. If a slot between sensor element (S1, S2) and encoder (23) becomes too small in the prior art arrangements, flipping and, hence, doubling of the measured rotational speed of the wheel can occur. This caused problems in safety devices of a vehicle, which require a correct indication of the wheel rotational speed for proper operation. To improve the tolerance with respect to the mounting position of the known arrangements, two separated signal paths (S1, f1; S2, f2) are provided with sensor elements (S1, S2) of differing sensitivity. The signal paths (S1, f1; S2, f2) are designed so that a signal path (S1, f1) is always available, which is provided with a maximum rate of sensitivity so that, in the undisturbed normal case, minimum image defects of the encoder track (13) are achieved, simultaneously with maximum air slots, while at the same time there is always an observing signal path (S2, f2), whose sensitivity is rated in such a way that flipping is safely prevented in all magnetic conditions.

18 Claims, 13 Drawing Sheets

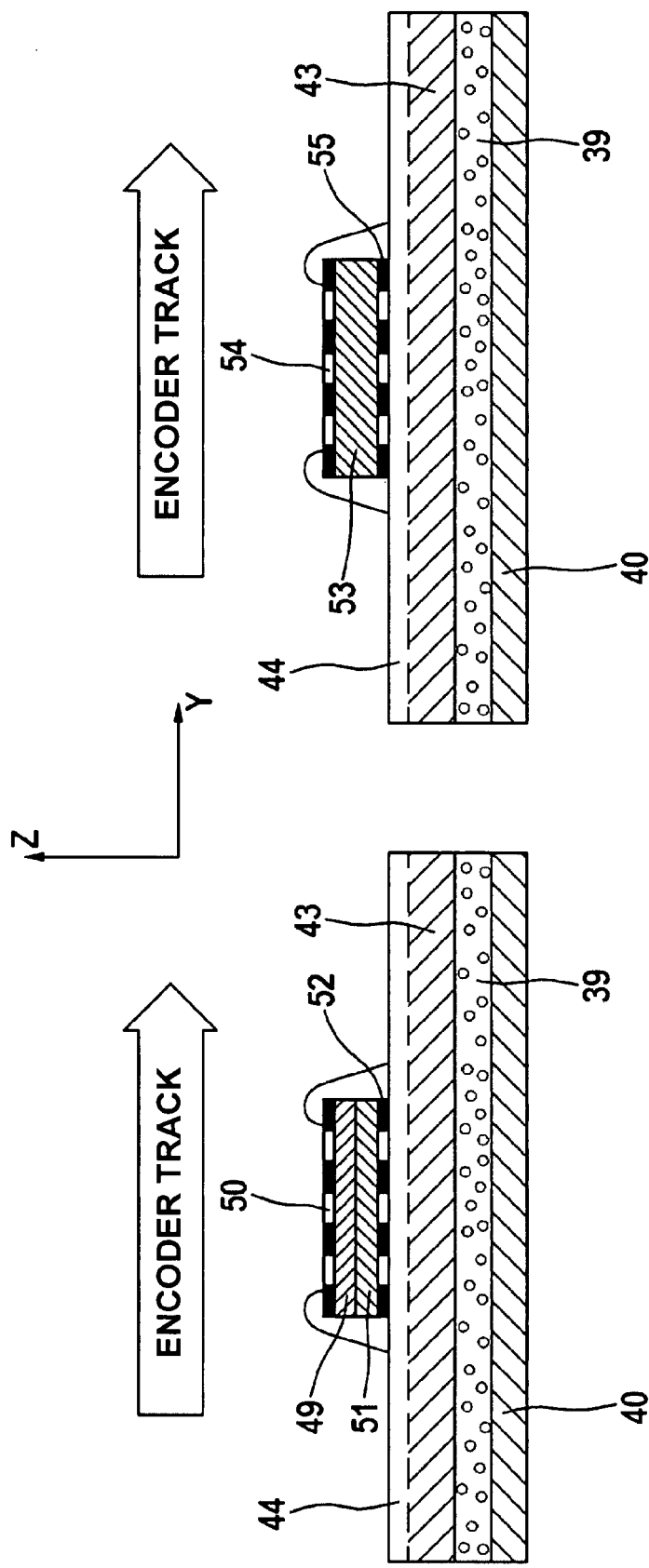

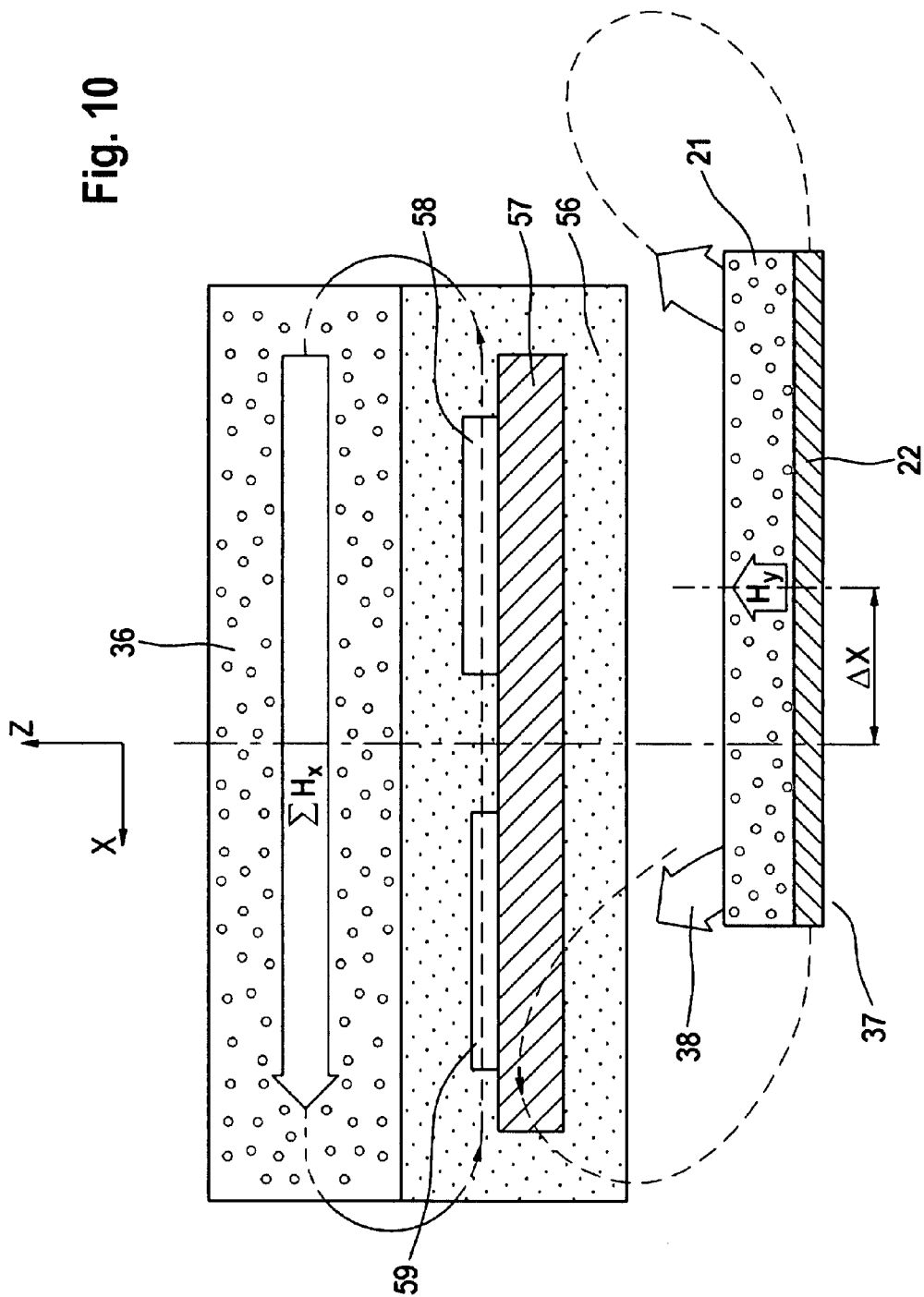

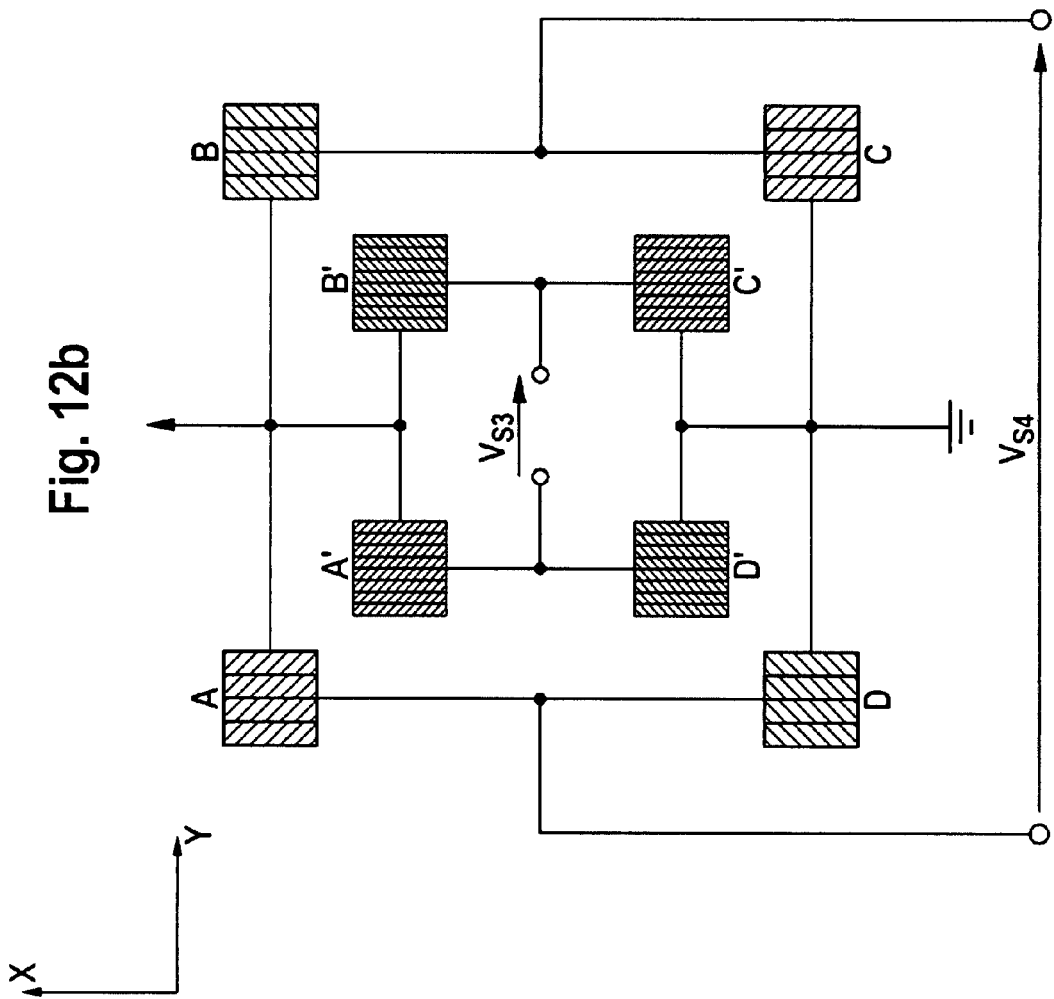
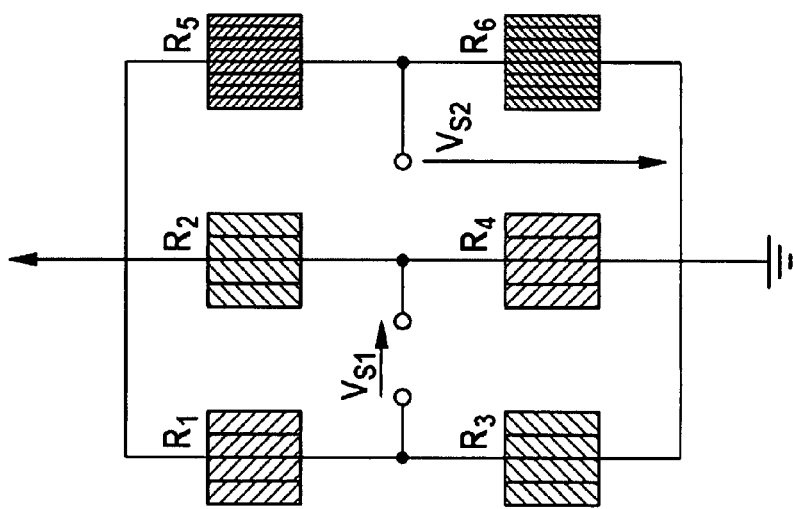

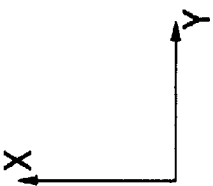

ARRANGEMENT FOR INTRINSICALLY SAFE DETECTION OF A WHEEL ROTATIONAL SPEED

BACKGROUND OF THE INVENTION

The present invention relates to a method for the detection of rotational speed of a wheel or any other rotating body by means of a sensor, which is coupled by way of a magnetic field to an encoder (5, 13, 23) that rotates with the rotating body. The signals of at least two separated signal paths (S1, f1; S2, f2) having at least one own sensor element (S, S1, S2) are compared with one another, and depending on the result of comparison, one of the two signal paths is connected to a subsequent electronic control unit (ECU) (25). The present invention also relates to an arrangement for detecting the rotational speed of a wheel or any other rotating body by means of a sensor (24), which is coupled by way of a magnetic field (H1, H2) to an encoder (23) that rotates with the rotating body. The sensor (24) includes two separated signal paths (S1, f1; S2, f2) having at least one own sensor element (S, S1, S2) and preferably an own signal conditioning stage (26, 27), the output signals of which are compared in a comparator (28), and in that depending on the result of comparison of the comparator (28), the first signal path (S1, f1) or the second signal path (S2, f2) of the two signal paths is connectable to a subsequent electronic control unit (ECU) (25). The invention also relates to a sensor module for avoiding or suppressing the measurement of interfering magnetic field components, which are modulated by movements of a magnet encoder (5, 13, 23, 37), composed of at least one first (35, 45, 50, 54) and one second magnetic field sensor element (34, 46, 52, 55) and at least one bias magnet (36, 39). With regard to a system of Cartesian coordinates, the magnet encoder (5, 13, 23, 37) with respect to its coding surface defined by its radii is arranged substantially in parallel to the x-y plane, in that the bias magnet (36, 39) with respect to its direction of magnetization and the magnetic field sensor elements (34, 35, 45, 46, 50, 52, 54, 55) with respect to their respective sensor surface are aligned essentially in parallel to the coding surface of the magnet encoder (5, 13, 23, 37) and, thus, in parallel to the x axis, and in that the first magnetic field sensor element (35, 45, 50, 54) and the second magnetic field sensor element (34, 46, 52, 55) are arranged differently as regards their distance from the magnet encoder (5, 13, 23, 37) in the z direction.

Active sensors for the automotive industry are known in the art in several cases. They exist in two-wire designs and three-wire designs. The description of the invention is based on the example of the two-wire design, as is conventional practice in brake systems. It is, however, covered by the invention to employ the basic idea also with respect to three-wire designs, being customary e.g. in motor applications and/or gear applications.

This state of the art is represented in FIG. 1. In FIG. 1a, a sensor 1 and an ECU (Electronic Control Unit of the ABS controller, or generally an electronic check unit) 2 are electrically connected to each other by way of a two-wire line 3, 4. The operation of the sensor requires an operating voltage $V_B$ which is provided by the ECU at terminals $K_1$, $K_2$. A signal current $I_S$ flows back to the ECU via the sensor, its strength varying in the beat of a rotational speed information, which is generated by an encoder 5 and decoded in the ECU. In FIG. 1b, a sensor 6 and an ECU 7 are interconnected electrically by way of a three-wire line 8, 9, 10. The operation of the sensor requires an operating voltage $V_B$ in this case, too, which is provided by the ECU at terminals $K_1'$, $K_2'$. The sensor returns a signal current $V_S$ containing the sensorial information to the ECU via the terminal K3.

FIG. 2 shows the inside system configuration of two typical variants of active wheel rotational speed sensors with a two-wire interface. Sensors for the unidirectional rotational speed detection without additional functionalities can be schematized according to FIG. 2a. The wheel rotational speed sensor 1 comprises a sensor module composed of the magnetoresistive sensor element S, which is connected to an electronic signal conditioning stage SC. The sensor element is coupled to the encoder E by way of a magnetic field H. The encoder rotating at wheel rotational speed modulates the air slot field H with an incremental pattern, which contains the wheel rotational speed information. Sensor element S and the signal conditioning stage SC produce from this air slot field modulation a signal voltage for controlling a modulator stage M, which in turn controls a current source 11 so that the incremental pattern of the encoder is represented as a load-independent signal current Is1. Sensors for the bidirectional detection of wheel rotational speeds and/or for the transfer of additional (diagnosis) parameters can be schematized according to FIG. 2b. In contrast to before, the signal conditioning stage is divided into the paths WS and ZI. Stage WS is used to condition the wheel rotational speed information from the encoder signal, while ZI serves for the separate conditioning of additional information from the sensor/encoder interface. Such additional information can e.g. be the direction of rotation and the air slot size. In a signal stage SL, the signals conditioned by WS and Z1 are joined to a control signal for the modulator stage M, which in turn controls a current source 11 so that the protocol of wheel rotational speed functions and additional functions contained in the control signal is imaged as a load-independent signal current Is2. According to the state of the art, a three-level protocol or a PWM protocol (pulse width modulation) is employed at present.

It is possible to use ferromagnetic toothed wheels or perforated discs, on the one hand, which produce a variable magnetic air slot in combination with a permanent magnet. On the other hand, permanently magnetized north-south pole areas can be used, which are embedded in alternating sequence into a wheel bearing seal, for example. The necessary auxiliary magnets are integrated in the sensor as a mechanical component of the sensor module. The explanation of the invention hereinbelow is limited to the basic technical application, i.e. the combination of magnetoresistive sensors with permanently magnetized encoders, however, it is possible to the expert in the art to apply the principles of the invention directly to combinations with ferromagnetic encoders, what is also in the sense of the invention.

FIG. 3 shows directions of reference and characteristic curves herein used for explaining specific physical circumstances of magnetoresistive sensor elements in connection with the improvements aimed at by the invention. FIG. 3a shows a magnetoresistive special sensor module 12 according to FIG. 2a in its geometric alignment to a permanently magnetized encoder track 13 during wheel rotational speed operation. The encoder track lies flatly in the XY plane and moves relative to the sensor element in the Y direction. Part 14 of the sensor module comprises a bridge circuit 16 made up of four magnetoresistive perm alloy (barber pole) resistors 18, as illustrated in FIG. 3b. The plane of the resistance layers extends like the plane of the encoder in parallel to the XY plane. FIG. 3c shows the operating characteristic curve of signal voltage Vss as a function of the magnetic air slot field strengths Hy, Hx1 and Hy, Hx2. Herein, Hy is the magnetic field component in the moving sense of the encoder track, and Hx is a magnetic field component of the encoder in the transverse direction hereto. Hx1 and Hx2 are field components in x direction being oriented opposite each other. FIG. 3c shows that alternating HX1, HX2 components of the encoder magnetization lead to mirror-inverted characteristic curves 18, 19. The alternation of the characteristic curve linked to the alternating signs of the Hx components occurs abruptly and is referred to as 'flipping'. Flipping leads to unwanted corruption (doubling) of the encoder signal and is disturbing for the rotational wheel speed detection. In the current practice, flipping is avoided because a so-called bias magnet 15 with a polarization in the X direction produces a so-called supporting field, which is larger than the components Hx1, Hx2 and therefore fixes one of the two characteristic fields, e.g. 18.

FIG. 4 serves to explain the causes for the appearance of magnetic components of the encoder in the X direction. FIG. 4a shows an encoder, as viewed from the XZ plane, with its magnetic field 20, exiting from the magnetic track 21 to a ferromagnetic return path made of sheet metal 22. The lines of electric flux of the encoder track exit in a broad middle zone in parallel in the Z direction. In the marginal zones the direction of exit additionally tends to the X direction. These Hx components have an inhomogeneous character and are not desirable as regards rotational speed measurement. With an only small offset of the sensor module 12 in relation to the center line, as is illustrated in FIG. 4a, no appreciable Hx component becomes active so that the field strength of the bias magnet 15 always prevails and the characteristic curve 18 is stably impressed.

With an encoder according to FIG. 4b, the sensor, with the same offset relative to the central position, will move into a range of lines of electric flux, which contains already major Hx components so that the stability of the characteristic curve is jeopardized. Jeopardy becomes critical when the encoder has only a narrow magnetic reading track and/or a strong magnetization, and/or the sensor module is positioned relatively far outside the middle of the reading track, and/or the sensor module is positioned very closely at the encoder surface. Therefore, the very strong influence of one of these parameters or the combination of several of these parameters can cause a critical case where flipping as referred to hereinabove will develop.

An object of the invention is to counteract the occurrence of flipping as described hereinabove, or prevent it, or in general to disclose a technology, which enhances the inherent safety of a sensor module in such a manner that unwanted flipping is prevented, or suppressed, or automatically detected, and the sensor module signals this condition to the ECU.

SUMMARY OF THE INVENTION

According to the invention, this object is achieved by a method for the detection of rotational speed according of a wheel or any other rotating body by means of a sensor, which is coupled by way of a magnetic field to an encoder (5, 13, 23) that rotates with the rotating body. The signals of at least two separated signal paths (S1, f1; S2, f2) having at least one own sensor element (S, S1, S2) are compared with one another, and depending on the result of comparison, one of the two signal paths is connected to a subsequent electronic control unit (ECU) (25). The present invention also relates to an arrangement for detecting the rotational speed of a wheel or any other rotating body by means of a sensor (24), which is coupled by way of a magnetic field (H1, H2) to an encoder (23) that rotates with the rotating body. The sensor (24) includes two separated signal paths (S1, f1; S2, f2) having at least one own sensor element (S, S1, S2) and preferably an own signal conditioning stage (26, 27), the output signals of which are compared in a comparator (28), and in that depending on the result of comparison of the comparator (28), the first signal path (S1, f1) or the second signal path (S2, f2) of the two signal paths is connectable to a subsequent electronic control unit (ECU) (25). The invention also relates to a sensor module for avoiding or suppressing the measurement of interfering magnetic field components, which are modulated by movements of a magnet encoder (5, 13, 23, 37), composed of at least one first (35, 45, 50, 54) and one second magnetic field sensor element (34, 46, 52, 55) and at least one bias magnet (36, 39). With regard to a system of Cartesian coordinates, the magnet encoder (5, 13, 23, 37) with respect to its coding surface defined by its radii is arranged substantially in parallel to the x-y plane, in that the bias magnet (36, 39) with respect to its direction of magnetization and the magnetic field sensor elements (34, 35, 45, 46, 50, 52, 54, 55) with respect to their respective sensor surface are aligned essentially in parallel to the coding surface of the magnet encoder (5, 13, 23, 37) and, thus, in parallel to the x axis, and in that the first magnetic field sensor element (35, 45, 50, 54) and the second magnetic field sensor element (34, 46, 52, 55) are arranged differently as regards their distance from the magnet encoder (5, 13, 23, 37) in the z direction.

The invention is based on the idea of using two signal paths with at least one sensor in each case, and these signal paths having a different design in terms of measuring technique with respect to the detection of magnetic fields that are modulated by a moving magnet encoder.

The principle of the arrangement of the invention basically resides in that the output signal of the one signal path is evaluated by the electronic control unit on a regular basis (in the event of equality of the output signals), while in the event of inequality of the output signals of the two signal paths the output signal of the other signal path is evaluated.

The arrangement of the invention achieves enhanced safety by way of the correctness of the detected rotational speed for the case that both output signals, which can e.g. indicate the rotational speed of the wheel monitored, are equal. Suitably, one will connect that signal path to the control unit in the event of inequality of the output signals, which is more likely to furnish the correct information.

A bias magnet implies both a permanent magnet and an electromagnet, which is used to generate a defined offset magnetic field strength.

A magnetic field sensor element relates to a sensor element, which can detect magnetic fields and can convert defined quantities of these fields into an appropriate measured variable, and can output it, that means more particularly magneto-electric transducer elements such as GMR sensor elements or Hall bridges.

The specifications regarding direction and distance disclosed within the limits of this application are to be understood with the premise that these specifications also cover embodiments which are subject to defined tolerances or to which the specifications basically apply.

A sensor module refers to a module, which includes at least one sensor element, but not necessarily an electronic circuit for the signal evaluation and not necessarily an electronic circuit for digital data processing. But it is possible and arranged for that both an electronic circuit for signal evaluation and optionally an electronic circuit for digital data processing can be integrated into a sensor module. The sensor module may be a part of a system as disclosed in the invention.

Preferably, the first signal path exhibits a considerably higher degree of sensitivity than the second signal path. Hence, it responds also to weak signals of the encoder, on the one hand. On the other hand, however, it is also easier for spurious signals to corrupt the result. Switch-over to the second signal path is made in this case, which is less interference-prone. Practically seen, these combinations allow considerably enhancing the tolerance of the arrangement in terms of its mounting position. When the distance between e.g. the sensor element of the first signal path and the encoder becomes very short, erroneous information of the first signal path cannot be ruled out. With this short distance, however, it is very likely that the second signal path will output the correct information.

It is suitable that information about the rotational speed of a wheel that is wrong due to flipping on the first signal path is corrected instantaneously by way of switch-over to the second signal path.

In order to achieve a particularly great tolerance with regard to the installation position of the arrangement, it is advisable to use first and second signal paths (S1, f1; S2, f2) that are designed so that the first signal path (S1, f1) is no longer jeopardized by flipping if an air slot length is reached and the signal of the second signal path (S2, f2) can be detected above the noise.

It is hereby safeguarded that there is an installation position where the system operates redundantly and, thus, with great safety. When the air slot is further reduced then, the sensitivity of the two signal paths will grow. Eventually, this can cause flipping on the first signal path, however, the sensitivity of the second signal path is simultaneously improved so that it will indicate the correct rotational speed with great likelihood.

It is preferred that the sensor elements of the two signal paths are arranged in one joint housing and preferably possess one joint bias magnet.

A sensor module is disclosed for avoiding or suppressing the measurement of disturbing magnetic field components, which are modulated by movements of a magnet encoder. This sensor module is composed of at least one first and one second magnetic field sensor element and at least one bias magnet, wherein with regard to a system of Cartesian coordinates, the magnet encoder with respect to its coding surface defined by its radii is arranged substantially in parallel to the x-y plane; wherein the bias magnet with respect to its direction of magnetization and the magnetic field sensor elements with respect to their respective sensor surface are aligned essentially in parallel to the coding surface of the magnet encoder and, thus, in parallel to the x axis, and the first magnetic field sensor element and the second magnetic field sensor element are arranged differently relative to their distance in the z direction from the magnet encoder. Preferably, the particularly two magnetic field sensors of the sensor module have different rates of sensitivity.

It is expedient that the magnetic field sensor elements and the bias magnet of the sensor module in relation to each other and with respect to the magnet encoder are arranged in such a manner that the first magnetic field sensor element detects the magnetic field components in z direction, which are modulated by the magnet encoder, with a higher level than the at least one other magnetic field sensor element, and that the second magnetic field sensor element detects magnetic field components in an x direction, caused by the bias magnet, in a manner augmented with at least one defined level as compared to magnetic field components in x direction modulated by the magnet encoder.

The field of application of the arrangement of the invention is not limited to rotating wheels, but can also be employed similarly in an effective fashion with respect to linear movements. However, it is especially advantageous to apply the invention where the output signals of the two signal paths (S1, f1; S2, f2) describe the rotational speed of the encoder and if the output signals of the two signal paths (S1, f1; S2, f2) at the comparator are equal, then the first signal path is connected to the electronic control unit (ECU) (25), and if the output signals of the two signal paths (S1, f1; S2, f2) are not equal, then the second signal path (S2, f2) is connected to the subsequent electronic control unit (ECU) (25).

Preferably, the arrangement is used to derive signals, which describe the state of the arrangement, and thus it is rendered possible when evaluating the information output by the arrangement to take the state of this arrangement into consideration.

Further preferred embodiments can be seen in the subsequent description of embodiments by way of schematic Figures.

The arrangement proposed is preferably used for the intrinsically safe wheel rotational speed detection with the aid of so-called active sensors with sensor elements on the basis of the magnetoresistive, in particular anisotropic, effect. The invention can be employed in the complete field of plant engineering and mechanical engineering, especially in the automotive industry, and herein mainly in the field of electronically controlled brake systems. Both the method disclosed and the arrangement of the invention as well as the sensor module of the invention can be used individually or in combination with each other.

The following Figures serve to explain the state of the art, directions of reference employed, and the invention with various embodiments. In the accompanying drawings:

BRIEF DESCRIPTION OF THE DRAWINGS

FIG. 9 is a second embodiment for the spatially separated signal paths;

FIG. 10 shows the principle of the separation by different inherent anisotropies;

FIG. 12 shows schematic diagrams of sensitive bridge structures applicable in the invention;

FIG. 13 shows geometric variants of bridge structures applicable in the invention.

DETAILED DESCRIPTION OF THE DRAWINGS

Figure 1A:
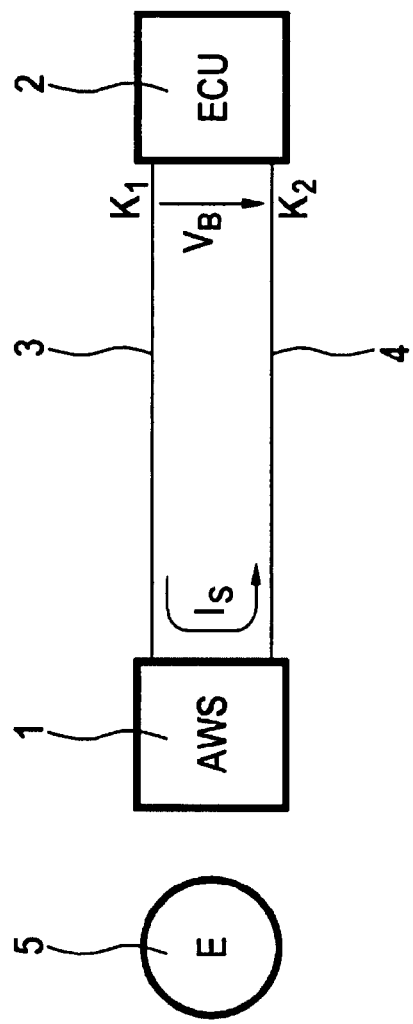
FIG. 1 shows the principal design of two wheel rotational speed detection systems.
Figure 1B:
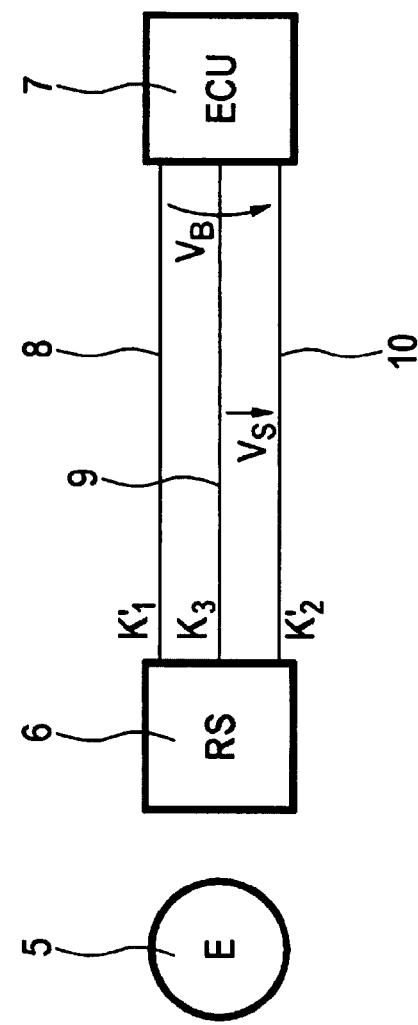
Figure 2A:
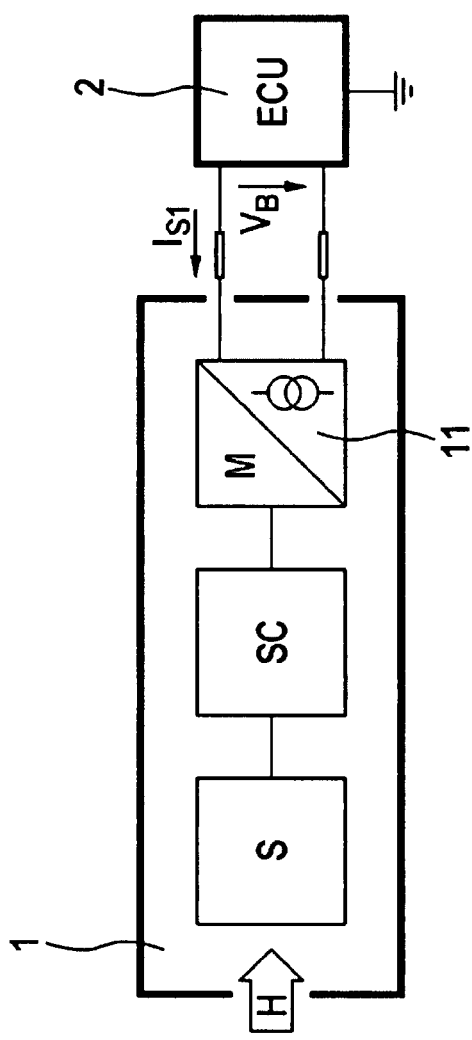
FIG. 2 shows the schematic design of typical sensor modules.
Figure 2B:
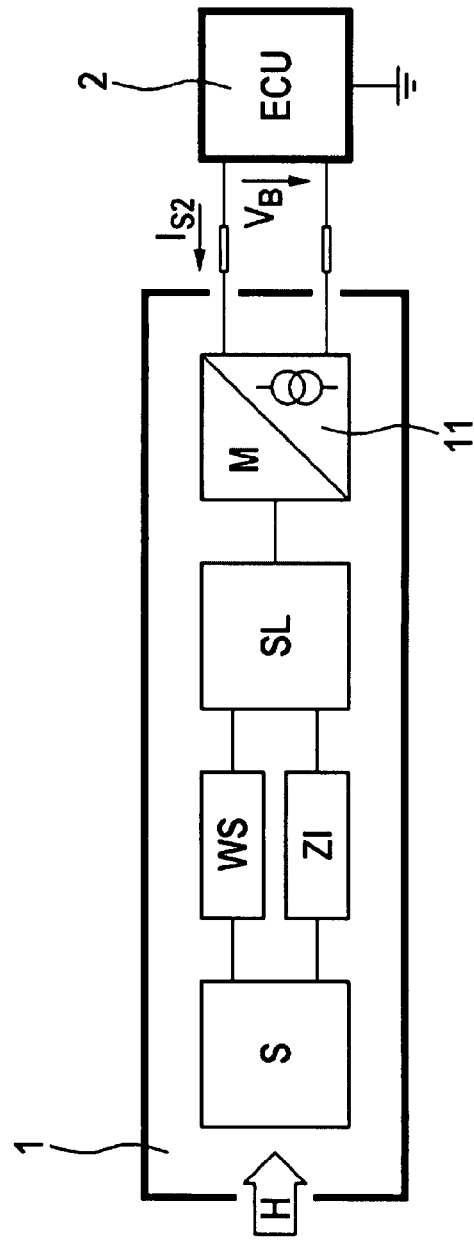
Figure 3B:
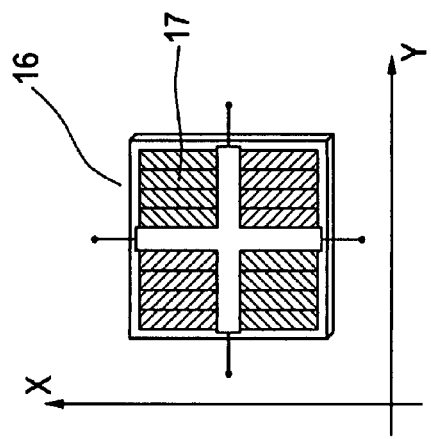
FIG. 3 shows the directions of reference and characteristic curves on which the present description is based.
Figure 3C:
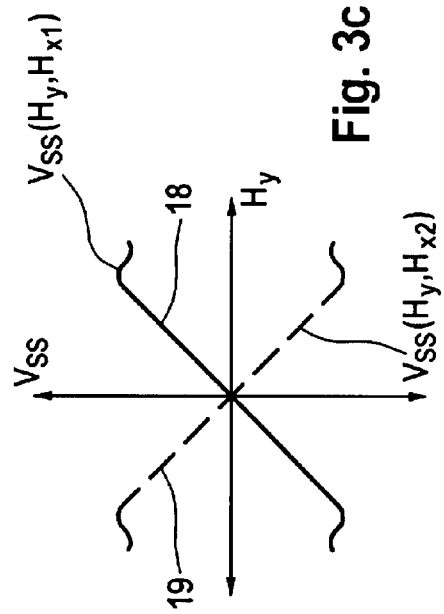
Figure 3A:
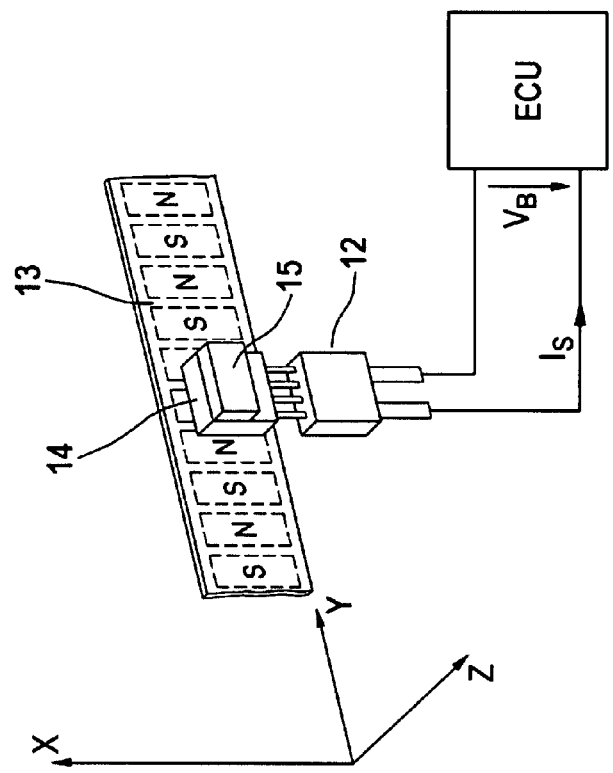
Figure 4B:
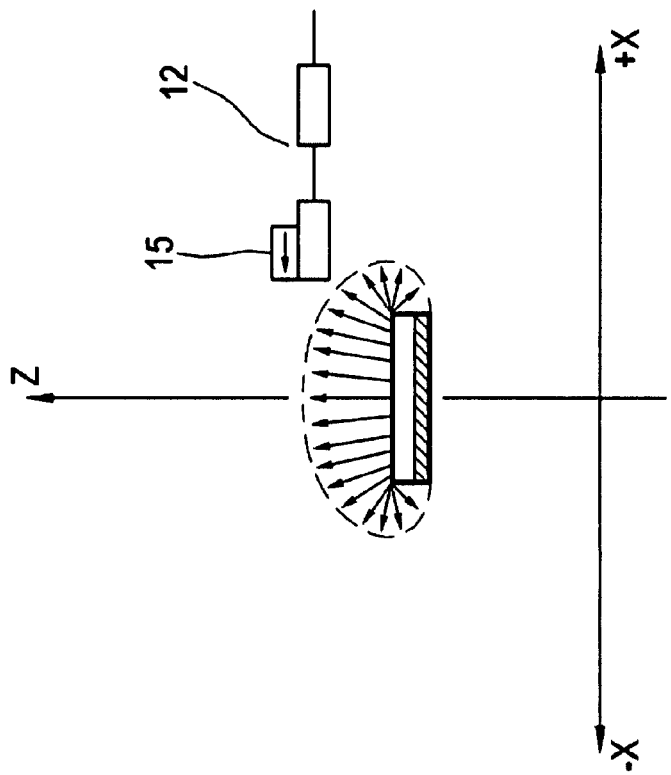
FIG. 4 shows the schematic course of the lines of electric flux by way of a magnetic pole wheel.
Figure 4A:
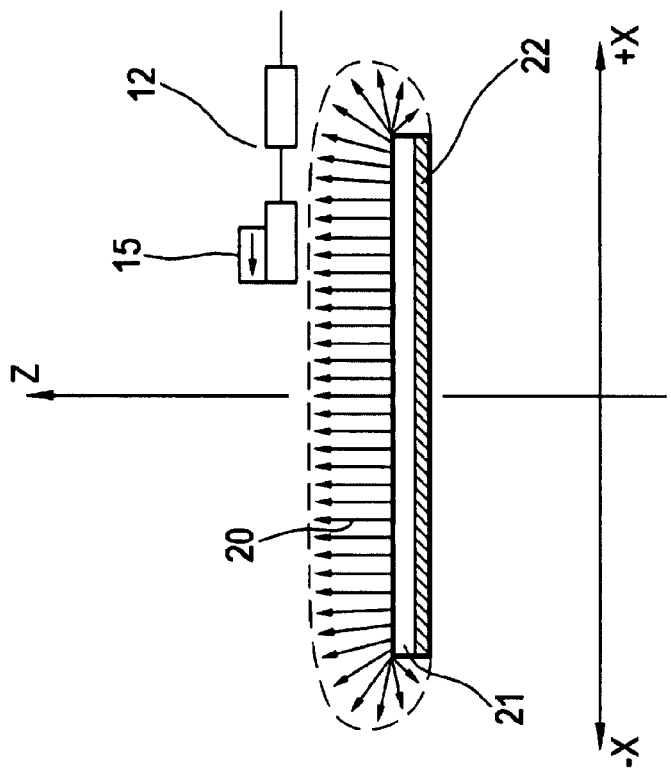
Figure 5:
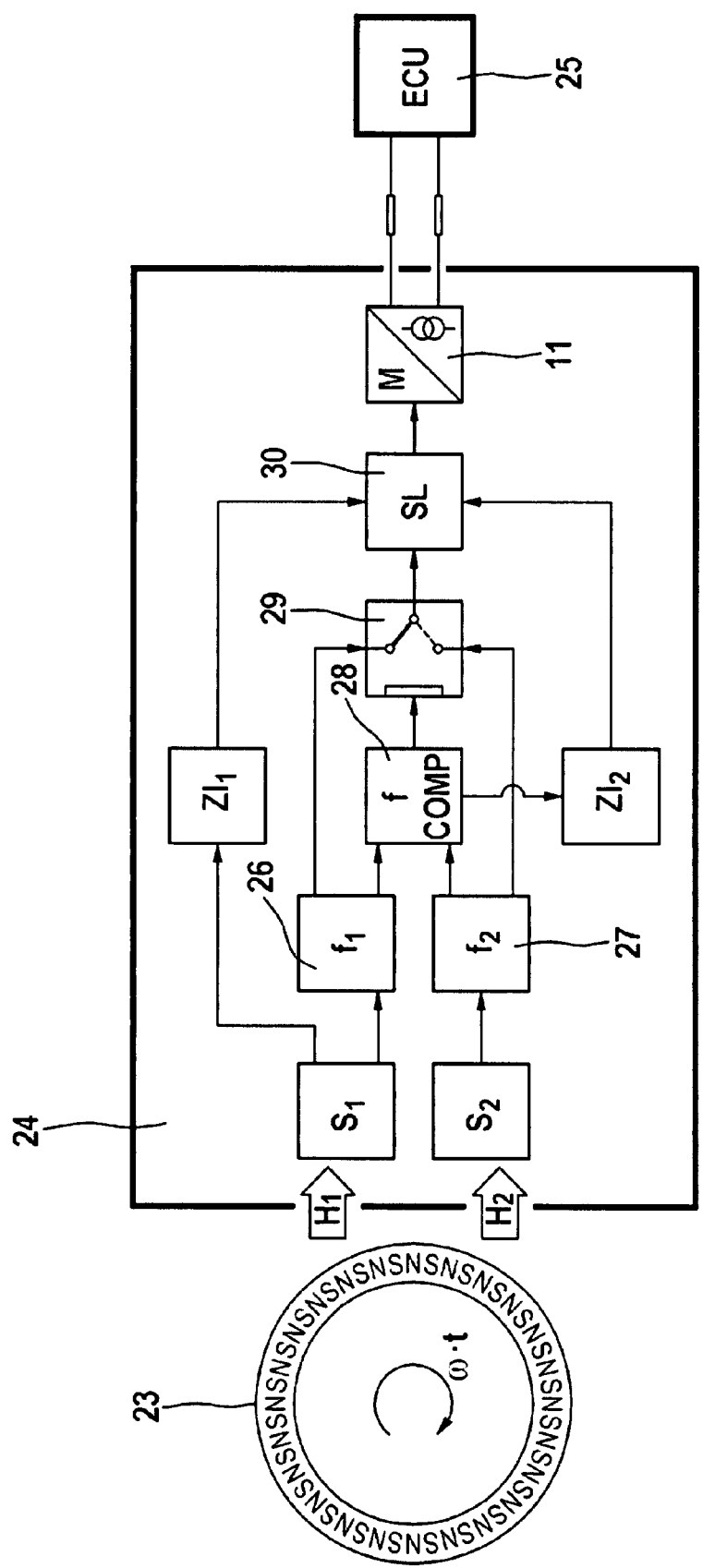
FIG. 5 shows the principal design of the arrangement of the invention in a block diagram.

FIG. 5 shows an exemplary arrangement, composed of an encoder 23, the intrinsically safe sensor 24, connected to the ECU 25. The sensor 24 comprises two magnetoresistive sensor elements S1 and S2, which are magnetically coupled to the encoder by appropriate constructive measures, in general via two magnetic air slots of different air slot field strengths H1 and H2, with the special case H1=H2 being taken into consideration in the invention and being also presented as implemented in an embodiment. From each of the sensor elements, a wheel rotational speed signal is conditioned by way of an associated signal conditioning stage 26, 27. For the case of a wheel rotational speed sensor of the type according to FIG. 2*b*, as is presented herein as an overlapping example, additional information ZI1 is derived from the sensor element S1, which corresponds in its functionality to information described by ZI in FIG. 2*b*. The signal frequencies of the stages 26 and 27 are compared for concurrence in a frequency comparator stage 28. The comparator stage 28 generates as a result protocol a status bit regarding the concurrence or non-concurrence of the signal frequencies. Simultaneously, the comparator stage 28 controls an electronic commutator 29, which alternatively connects the signal path originating from S1, 26 or from S2, 27 to a signal logic 30, while the signal paths of the additional information ZI1, ZI2 are always connected to this signal logic 30. The signal logic produces therefrom a signal protocol, which is imaged as a signal current pattern by way of the modulator M and the current source 11 and propagates to the ECU 25.

Hence, a signal path is always available that is provided with a maximum rate of sensitivity so that, in the undisturbed normal case, minimum image defects of the encoder track can be achieved simultaneously with maximum air slots, while at the same time there is always an observing signal path, whose sensitivity is rated in such a way that flipping is safely prevented in all magnetic conditions. The following rating instruction is suggested in this regard:

An exemplary condition for rating the sensorial sensitivity of the more sensitive path is given in that the more sensitive path with (e.g. 6 dB) safety is no longer allowed to be jeopardized by flipping if an air slot length is reached, where the signal of the insensitive path with (e.g. 6 dB) safety can be detected above the noise.

The technical principles of the exemplary design variants that will be described later on and their combination allow a great design variety.

The following variants of the signal evaluation for enhancing the inherent safety of the wheel rotational speed sensor against flipping are proposed:

First Case:

Frequency (sensitive path) is equal to frequency (observing path)

Pfad redundancy statement great inherent safety only the sensitive path is used

Second Case:

Frequency (sensitive path) is unequal to frequency (observing path)

Diagnosis statement about flip condition can be proved in the signal protocol only the observing path is used availability of the wheel rotational speed information is preserved for an emergency operation.

Figure 6:
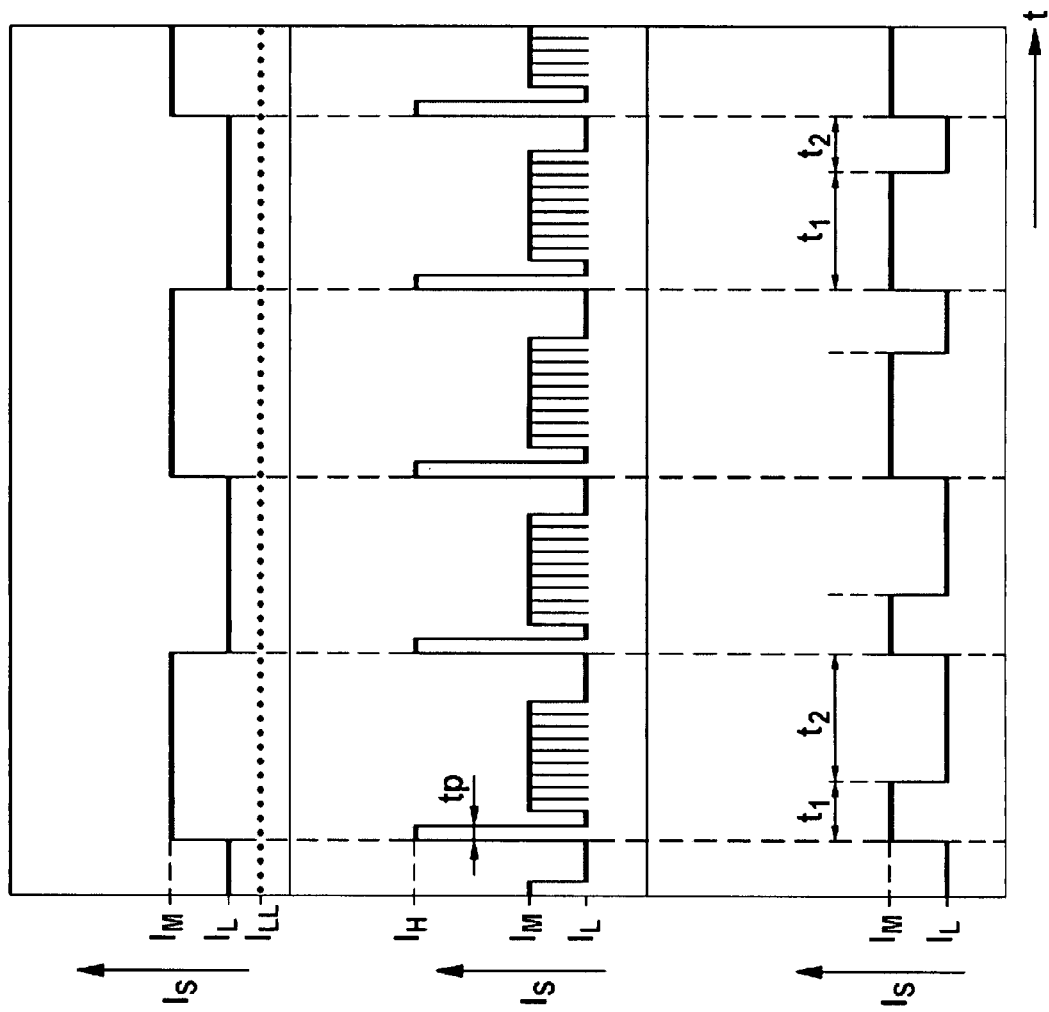
FIG. 6 shows the signal protocols employed in prior-art wheel rotational speed detection systems.

FIG. 6 shows currently customary signal protocols and possibilities of transmitting diagnosis information about flipping to the ECU.

FIG. 6*a* shows the two-level protocol, which has become established as a standard of unidirectional wheel rotational speed detection. Herein, the state of flipping as an example is proved to the ECU by a constant rest level.

FIG. 6*b* shows a three-level protocol, which is also employed in the automotive industry. While rotational speed information is detected by way of level Ih, various additional pieces of information such as the direction of rotation, air slot size, are coded in a serial order of bits in the level range Im and Il. There is the favorable possibility of using one of these bits for coding the state of flipping. A considerably improved safety of installation can be checked in connection with the already provided air slot diagnosis.

FIG. 6*c* illustrates a PWM protocol, which is also employed in the automotive industry. Herein, the state of flipping can be proved to the ECU by way of a defined pulse-width ratio.

To realize the characteristics of the sensitive and the observing signal path, two technical concepts are proposed, which can be used as an alternative of each other or in combination. The first alternative concept is based on the use of a spatial offset of two equally sensitive sensorial structures (e.g. bridges) in Z direction in relation to the XY plane of the encoder. The second alternative concept is based on the use of two differently sensitive sensorial structures in a plane parallel to the XY plane of the encoder. The third concept is the combination of two differently sensitive sensorial structures with a spatial offset relative to each other in Z direction in relation to the XY plane of the encoder. The different embodiments of the sensor modules are the result of these concepts.

Figure 7:
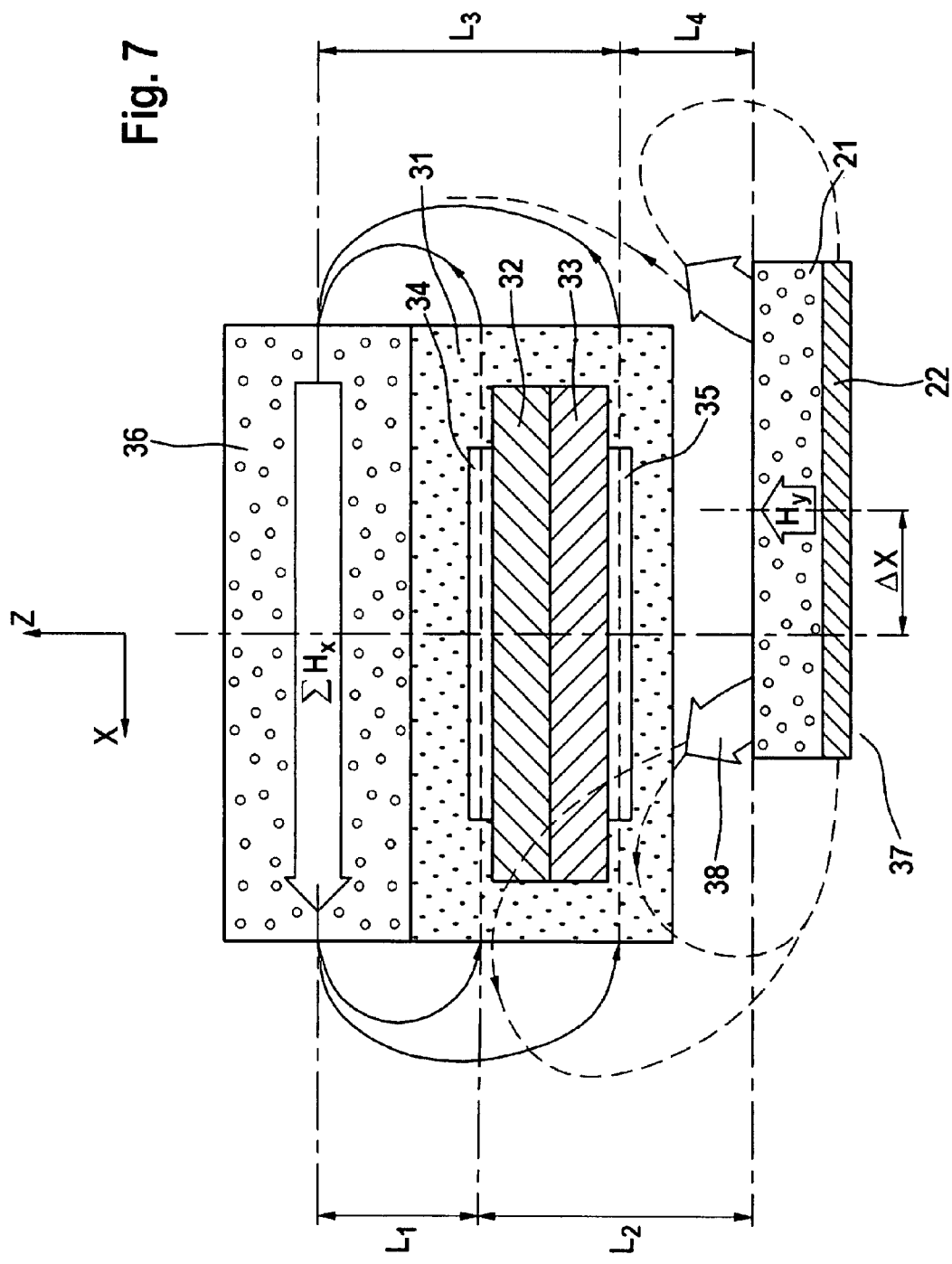
FIG. 7 shows the principle of the spatial separation of the sensor elements.

FIG. 7 shows the concept of an exemplary sensor module in which two sensorial structures being offset in Z direction relative to each other, mainly bridge structures, can exhibit both equal and unequal sensorial sensitivities relative to an equal magnetic reference field strength. Two silicon carriers 32, 33 with sensitive bridge structures, or magnetic field sensor elements 34, 35, respectively, are fitted in a housing made of plastics 31. The spatial offset in Z direction develops due to the back-to-back arrangement of these two chips. A separate bias magnet 36 with polarization in X direction magnetically biases the two sensorial layers due to their spatial offset in Z direction with different field strengths Hx relative to the field components of an encoder 37, with magnetic layer 21 and outside iron core 22. The reading track of the sensor is offset in X direction relative to the middle track of the encoder so that an interfering Hx component 38 counteracts the bias fields, which could lead to flipping. The exemplary sensor module uses the following technical oppositions in order to realize the demanded maximum sensitive path as well as additionally the observing path, which is maximally resistant to flipping. With regard to the sensor structure 35, the distance L3 to the bias magnet is relatively large, while the distance L4 to the surface of the encoder is relatively short, i.e. a relatively strong magnetic component Hy of the encoder acts in the event of a relatively weak bias component Hx. Thus, the structure/magnetic field sensor element 35 is highly sensitive, as requested. The opposite is the case in the sensor structure/magnetic field sensor element 34. The distance L1 to the bias magnet is relatively short, while the distance L2 to the surface of the encoder is relatively large, i.e. in the event of a relatively strong bias component Hx, only a relatively weak interfering counter component of the encoder will act, which can no longer trigger flipping. For the continued adaptation to a predetermined sensor-encoder-air-slot interface, the technically most favorable combination of the following parameter variation possibilities can be used:

Selection of the thickness of the silicon carrier layers for the adaptation of a mutual distance of the magnetic field sensor elements 34, 35 in Z direction;

Selection of the distance of the silicon carrier layer package to the encoder surface by choosing the depth of insertion into housing 31;

Adaptation of the strength of the magnetic field produced by the bias magnet;

Adaptation of the geometrical distance of the bias magnet from the silicon carrier layer package by choosing the interposed housing layer thickness;

Selection of the individual sensitivity of each of the two magnetic field sensor elements or magnetoresistive structures 34, 35.

Figures 8A, 8B:
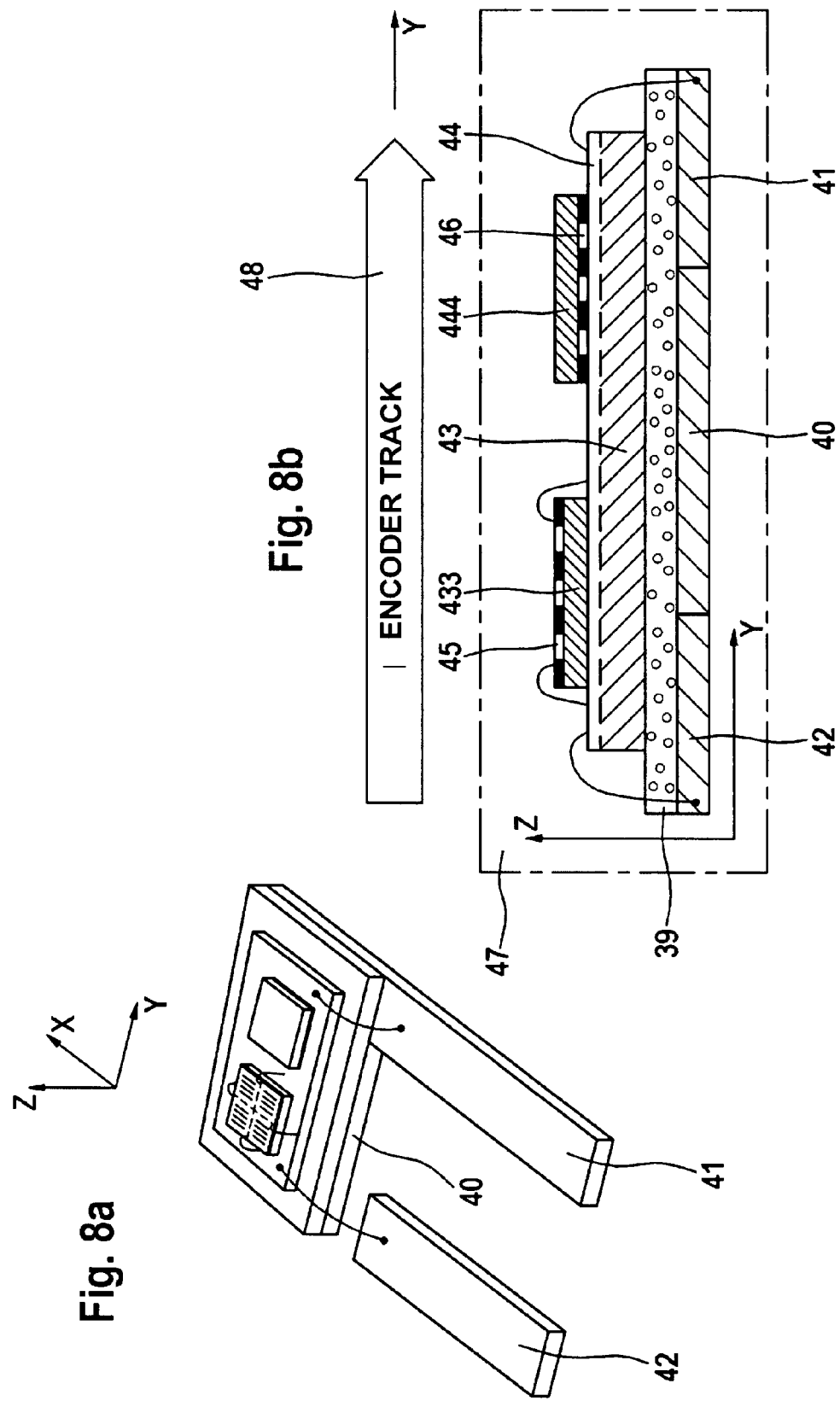
FIG. 8 is a first embodiment for the spatially separated signal paths.

FIG. 8 shows the diagrammatic view of another exemplary embodiment of a sensor module according to the concept of FIG. 7. FIG. 8*a* is a three-dimensional view in relation to the sectional sketch FIG. 8*b*. The bias magnet 39 is herein applied as a magnetic layer (e.g. as SmCo) to the lead frame 40. The lead frame termination 41 and a lead frame counterpart 42 form the two-wire connections of a sensor module (the necessary cast housing 47 is not shown). Above the magnetic layer, a silicon chip 43 with ASIC 44 is arranged that is used for the signal conditioning up to the signal current generation according to FIG. 2. Provided on this ASIC at a lateral distance from each other are two silicon carriers 433, 444 with magnetoresistive bridges 45, 46, with bridge 46 being electrically connected to ASIC in Flip-Chip technology, while bridge 45 is electrically connected to ASIC in bond technology. Opposite to an encoder track 48, reference numeral 45 designates a magnetic field sensor element of the sensitive path, and reference numeral 46 refers to a flip-resistant magnetic field sensor element of the observing path.

FIG. 9 shows two other variants of sensor modules. Common to both variants is the stacking of a lead frame 40, a bias magnet 39, a silicon chip 43 with ASI 44, as known from FIG. 8 already, with the difference that the magnetic layer herein is applied to the rear side of the silicon chip 43 rather than to the lead frame. In FIG. 9*a*, a stack of two silicon chips 49, 51, which are mechanically fixed to one another 'back-to-back', are electrically contacted with the ASIC using the magnetic field sensor element 52 by means of FlipChip technology, while the magnetic field sensor element 50 is connected to the ASIC by way of Bond connections. The entire arrangement of FIG. 9*a* comprises the function elements of a sensor module. In a variant according to FIG. 9*b*, one single silicon chip 53, in its capacity of a carrier of two magnetoresistive sensor elements 54, 55, replaces the stack 49, 51 according to FIG. 9*a*, while the functionality is identical in other respects.

Figure 11:
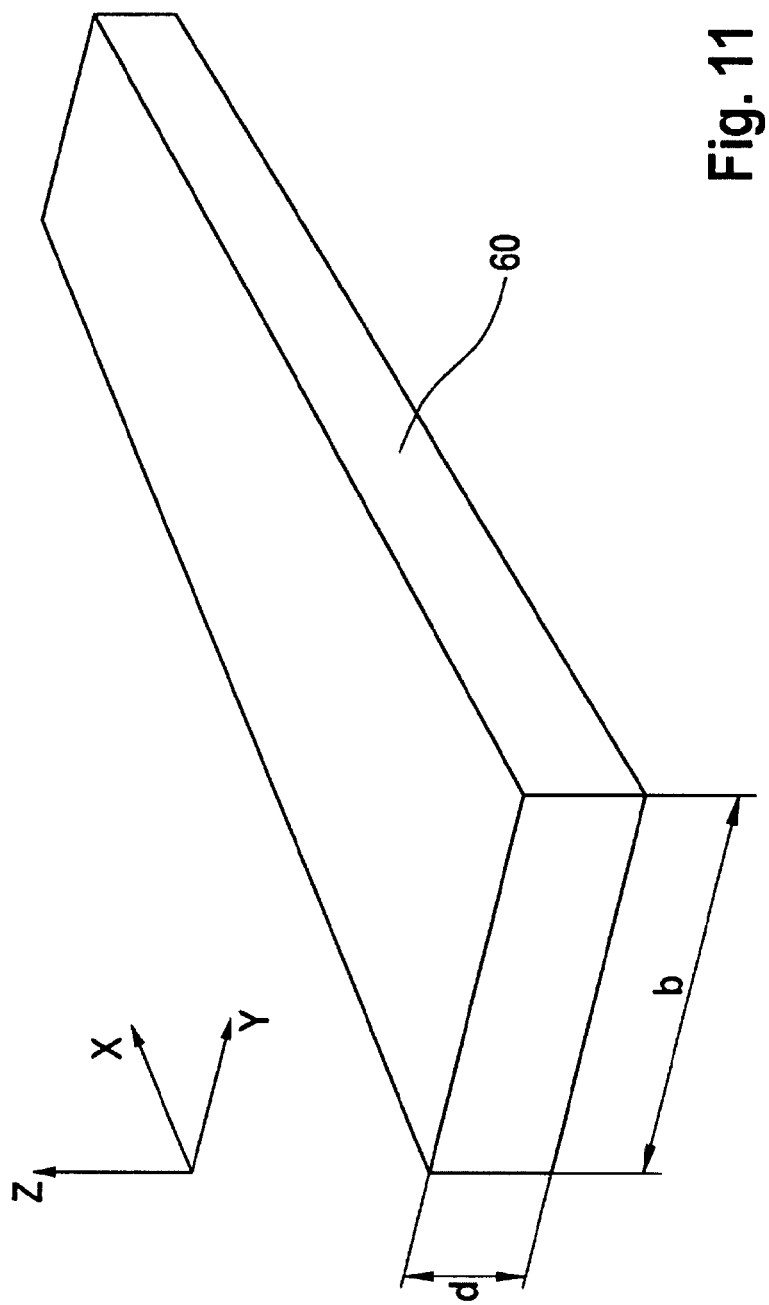
FIG. 11 shows parameters for influencing the inherent anisotropy.

FIG. 10 shows an embodiment of the alternative concept of two sensorial structures, mainly bridge structures, which are offset relative to each other in the same XY plane and exhibit unequal sensorial sensitivities in relation to an equal magnetic reference field strength. A silicon carrier 57 with sensitive bridge structures, or magnetic field sensor elements 58, 59, respectively, are fitted in a housing made of plastics 56. The spatial offset of these two bridge structures or sensor elements occurs in the plane of the silicon carrier in parallel to the XY plane of the encoder 37. A separate bias magnet 36 with polarization in X direction magnetically biases the two sensorial layers due to their spatial offset in X and/or Y direction with different field strengths Hx relative to the field components of an encoder 37, with magnetic layer 21 and outside iron core 22. The reading track of the sensor module is offset in X direction relative to the middle track of the magnet encoder so that an interfering Hx component 38 counteracts the bias fields, which could lead to flipping. The exemplary embodiment makes use of a technical possibility illustrated in FIG. 11 to modify the inherent anisotropy of a magnetoresistive structure within wide ranges in order to realize the demanded maximum sensitive path in addition to the observing path, which is maximally resistant to flipping. It is known that the magnitude of the inherent anisotropy H0 of a strip type resistor 60 made of perm alloy (being the most important magnetoresistive material) basically depends on the ratio between the strip width and the layer thickness, as indicated in the formula for H0, and is thus variable within wide limits. The sensitive path requires a sensor with a low inherent anisotropy, i.e. with relatively thin, broad strips, whilst the observing path requires a sensor with a great inherent anisotropy, i.e. with relatively thick, narrow strips. In connection with a suitably dimensioned bias magnetization, which sufficiently supports the inherent anisotropy of the flip-resistant sensor structure and, additionally, does not limit the sensitivity of the sensitive path to an excessive extent, it is possible to achieve the object of the invention exemplarily in a simple fashion.

FIG. 12 shows electric circuitries of sensorial elements for the two signal paths. In FIG. 12*a*, the sensitive path is given a magnetoresistive full bridge R1, R2, R3, R4 with the potential-free signal voltage Vs1, and the flip-resistant observing path obtains a half bridge R5, R6 with the (earth) potential-related voltage Vs2. In FIG. 12*b*, both paths comprise a full bridge A, B, C, D and A', B', C', D' with the associated potential-free signal voltages Vs4, Vs3. A barber pole structure is superposed on the magnetoresistive strip-type resistors for the linearization of the operational characteristic curve, or the strips themselves are geometrically aligned in barber pole patterns, there being no more need for an additional superstructure in this case.

FIG. 13 shows various favorable shapes of a geometrical arrangement of magnetoresistive bridge resistors according to FIG. 12*b* with reference to their alignment in parallel to the XY chip plane of their silicon carrier. The arrow presented below symbolizes the Y running direction of a moved encoder track relative to the bridge resistors. In FIG. 13*a*, the two bridge branches of the observing path enclose the centrically arranged bridge of the sensitive path in the running direction of the encoder track. In FIG. 13*b*, the two bridge branches of the sensitive path enclose the centrically arranged bridge of the observing path. In FIG. 13*c*, the two bridge branches of the observing path enclose the centrically arranged bridge of the sensitive path in the direction of the bias field. In FIG. 13*d*, the two bridge branches of the sensitive path enclose the centrically arranged bridge of the observing path in the direction of the bias field. In FIG. 13*e*, the bridge elements of the observing path enclose centrically the centrically arranged bridge elements of the sensitive path, while matters are exactly vice-versa in FIG. 13*f*. In FIG. 13*g*, the bridge branches of the sensitive and the observing path are alternating in the Y running direction.

The invention claimed is:

1. A method for detecting rotational speed of a wheel or any other rotating body by means of a sensor, which is coupled by way of a magnetic field to an encoder (5, 13, 23) that rotates with the rotating body, the method comprising:

comparing signals of at least two separated signal paths (S1, f1; S2, f2) each having at least one sensor element (S, S1, S2) with one another; and connecting one of the two signal paths to an electronic control unit based on the comparison; and wherein the two signal paths (S1, f1) each has a sensitivity different from the other signal path (S2, f2) based upon a spatial offset from a bias magnet in a direction perpendicular to a direction of polarization of the bias magnet.

2. A system for detecting rotational speed of a wheel or any other rotating body by means of a sensor (24), which is coupled by way of a magnetic field (H1, H2) to an encoder (23) that rotates with the rotating body, the system comprising:

a sensor (24) having two separated signal paths (S1, f1; S2, f2) each having at least one sensor element (S, S1, S2)

and one signal conditioning stage (26, 27), wherein a system of Cartesian coordinates defined by the magnet encoder with respect to a coding surface is arranged substantially in parallel to an x-y plane, wherein the sensor elements with respect to respective sensor surfaces are aligned essentially in parallel to the coding surface of the magnet encoder and in parallel to the x axis, and a first magnetic field sensor element and a second magnetic field sensor element each have a different distance from the magnet encoder in the z direction;

a comparator (28) wherein output signals of the signal paths are compared i; and an electronic control unit (ECU) (25) wherein depending on the result of comparison of the comparator (28), the first signal path (S1, f1) or the second signal path (S2, f2) of the two signal paths is connected to the electronic control unit (ECU) (25).

3. The system of claim 2, wherein the first signal path (S1, f1) has a sensitivity that is by a defined value higher than the sensitivity of the second signal path (S2, f2), and the first signal path (S1, f1) is arranged so that flipping is not ruled out and that the second signal path (S2, f2) is arranged so that flipping is ruled out.

4. The system of claim 2, wherein the first and the second signal path (S1, f1; S2, f2) are designed so that the first signal path (S1, f1) is no longer jeopardized by flipping if an air slot length is reached and the signal of the second signal path (S2, f2) can be detected above the noise.

5. The system of claim 2, wherein the output signals of the two signal paths (S1, f1; S2, f2) describe the rotational speed of the encoder and if the output signals of the two signal paths (S1, f1; S2, f2) at the comparator are equal, then the first signal path is connected to the electronic control unit (ECU) (25), and if the output signals of the two signal paths (S1, f1; S2, f2) are not equal, then the second signal path (S2, f2) is connected to the subsequent electronic control unit (ECU) (25).

6. The system of claim 5, wherein the output signals of the two signal paths are equal then the sensor can output information providing a redundancy statement and/or describing the high rate of inherent safety of the sensor, and in that in the event of inequality of the output signals of the two signal paths (S1, f1; S2, f2), the sensor can output information providing a diagnosis statement about an error condition of the first signal path.

7. The system of claim 5, wherein the event of the second signal path (S2, f2) being connected to the electronic control unit (25), the wheel rotational speed information is available to the unit for emergency operation.

8. The system of claim 2, wherein the sensor elements of the two signal paths (S1, f1; S2, f2) have approximately the same sensitivity and are spatially offset in relation to each other in Z direction relative to the XY plane of the encoder (23).

9. The system of claim 2, wherein the sensor element (S1) of the first signal path (S1, f1) has a higher rate of sensitivity than the sensor element (S2) of the second signal path (S2, f2), and in that the two sensor elements (S1, S2) are substantially arranged in a plane in parallel to the XY plane of the encoder (23).

10. The system of claim 9, wherein the sensor element of the first signal path (S1, f1) has a higher rate of sensitivity than the sensor element of the second signal path (S2, f2), and in that the two sensor elements are spatially offset in relation to each other in Z direction relative to the XY plane of the encoder.

11. The system of claim 2, wherein the sensor element (S1) pertaining to the first signal path (S1, f1) is provided with a magnetoresistive full bridge, and the sensor element pertaining to the second signal path (S2, f2) is provided with a magnetoresistive half bridge.

12. The system of claim 11, wherein the sensor elements of the two signal paths (S1, f1; S2, f2) are arranged on a joint silicon chip (43), and the silicon chip is provided with an ASIC, in which at least essential parts of the electric circuits pertaining to the signal paths (S1, f1; S2, f2) are integrated.

13. The system of claim 12, wherein the bias magnetic layer, a silicon chip (43) with ASIC, in connection with a lead frame (40), are stacked.

14. The system of claim 2, comprising at least one bias magnet (36, 39), wherein with regard to the system of Cartesian coordinates, the bias magnet (36, 39) is polarized in the x axis.

15. The system of claim 14, wherein the bias magnet biases the first and second sensor elements due to the spatial offset in the Z-direction.

16. A sensor module for avoiding or suppressing measurement of interfering magnetic field components, which are modulated by movements of a magnet encoder (5, 13, 23, 37), the sensor module comprising:

at least one first (35, 45, 50, 54) and one second magnetic field sensor element (34, 46, 52, 55) and at least one bias magnet (36, 39), wherein with regard to a system of Cartesian coordinates, the magnet encoder (5, 13, 23, 37) with respect to its coding surface defined by its radii is arranged substantially in parallel to the x-y plane, and the bias magnet (36, 39) with respect to its direction of magnetization and the magnetic field sensor elements (34, 35, 45, 46, 50, 52, 54, 55) with respect to their respective sensor surface are aligned essentially in parallel to the coding surface of the magnet encoder (5, 13, 23, 37) and, thus, in parallel to the x axis, and in that the first magnetic field sensor element (35, 45, 50, 54) and the second magnetic field sensor element (34, 46, 52, 55) are arranged differently as regards their distance from the magnet encoder (5, 13, 23, 37) in the z direction.

17. The sensor of claim 16, wherein the at least two magnetic field sensor elements (34, 35, 45, 46, 50, 52, 54, 55, 58, 59) have different rates of sensitivity.

18. The sensor of claim 16, wherein the magnetic field sensor elements (34, 35, 45, 46, 50, 52, 54, 55, 58, 59) and the bias magnet (36, 39) in relation to each other and with respect to the magnet encoder (5, 13, 23, 37) are arranged so that the first magnetic field sensor element (35, 45, 50, 54) detects the magnetic field components in z direction, which are modulated by the magnet encoder (5, 13, 23, 37), with a higher level than the at least one other magnetic field sensor element (34, 46, 52, 55), and the second magnetic field sensor element (34, 46, 52, 55) detects magnetic field components in x direction, caused by the bias magnet (36, 39), in a manner augmented with at least one defined level as compared to magnetic field components in x direction modulated by the magnet encoder.

* * * * *